(No Model.)
A. D. HEADLEY.
HORSE LEG PROTECTOR.
No. 536,625. Patented Apr. 2, 1895.
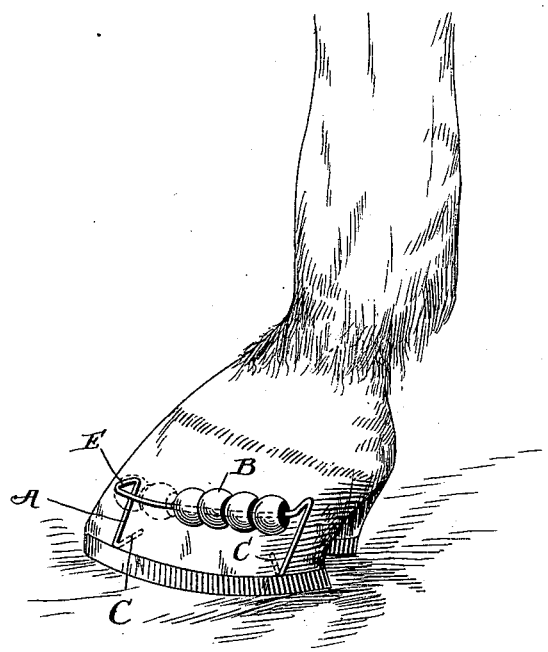
Witnesses:
C. H. Raeder
K. F. Matthews
Inventor
A. D. Headley.
By J. C. Smith
Attorney

UNITED STATES PATENT OFFICE.

ANDREW D. HEADLEY, OF BROOKLYN, NEW YORK.

HORSE-LEG PROTECTOR.

SPECIFICATION forming part of Letters Patent No. 536,625, dated April 2, 1895.

Application filed February 6, 1894. Serial No. 499,296. (No model.)

*To all whom it may concern:*

Be it known that I, ANDREW D. HEADLEY, a citizen of the United States, residing at Brooklyn, in the county of Kings and State of New York, have invented certain new and useful Improvements in Horse-Leg Protectors; and I do declare the following to be a full, clear, and exact description of the invention, such as will enable others skilled in the art to which it appertains to make and use the same.

This invention relates to means for preventing horses from injuring their legs by striking the heel calks of their shoes against them; the most common injury being what is called "interfering."

The invention consists in providing a frame of strong steel wire and arranging upon it one or more elastic rollers or buffers, and also arranging such frame upon the hoof of a horse near its bottom in such manner that it shall stand out from the hoof and provide play room for the rolling buffers, substantially as hereinafter specified and claimed.

In the drawing accompanying this specification, the figure represents a side view of my frame with a series of rolling buffers attached and provided with flanges at its base that are adapted to pass into the hoof immediately above the shoe for the purpose of secure fastening.

In constructing my frame, I take a strip of steel or other strong wire, and after stringing the buffers upon it, I bend it in such shape as will secure the buffers when on duty from resting upon the hoof. This is done by bending the wire in a rectangular form as shown in the drawing. To attach this form of frame to the hoof, I usually take a wire or brad of the proper size, and after heating it pass it into the hoof just above the shoe. The flanges of the frame are then passed into the openings so made and the frame is secure.

In the drawing, the frame above described is marked A; the buffers are marked B, and the flanges by which the frame is attached to the hoof, are marked C.

I find it desirable to cover the wire frame A, with rubber or other elastic tubing or cloth, and in all cases, I arrange the rolling buffers upon the inside of the hoof.

Having described my invention, what I claim is—

A horse leg protector comprising a wire frame upon which a series of revoluble rubber buffers are strung, said frame being bent to form stops for the buffers and having vertical legs and inwardly extending terminals for attachment between the animal's hoof and shoe, substantially as described.

In testimony whereof I affix my signature in presence of two witnesses.

ANDREW D. HEADLEY.

Witnesses:
CHARLES L. DU BOIS,
DAVID S. WATERS, Jr.